US011772536B1

(12) United States Patent
Maloney et al.

(10) Patent No.: US 11,772,536 B1
(45) Date of Patent: Oct. 3, 2023

(54) VEHICLE SEATING ASSEMBLY WITH LOWER LEG SUPPORT

(71) Applicant: Ford Global Technologies, LLC, Dearborn, MI (US)

(72) Inventors: Patrick Maloney, Livonia, MI (US); Kevin VanNieulande, Fraser, MI (US); Kevin Wayne Preuss, Berkley, MI (US); Marcos Silva Kondrad, Macomb Township, MI (US); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/874,572

(22) Filed: Jul. 27, 2022

(51) Int. Cl.
*B60N 2/10* (2006.01)
*B60N 2/90* (2018.01)

(52) U.S. Cl.
CPC ............... *B60N 2/995* (2018.02); *B60N 2/10* (2013.01)

(58) Field of Classification Search
CPC .................................. B60N 2/10; B60N 2/995
USPC ......................................................... 297/89
See application file for complete search history.

(56) References Cited

U.S. PATENT DOCUMENTS

| 6,412,870 B1* | 7/2002 | Higgins ................. B60N 2/995 297/354.13 |
| 9,284,055 B2 | 3/2016 | Beroth et al. |
| 2018/0339632 A1* | 11/2018 | Akaike ................. B60N 2/995 |
| 2021/0016688 A1* | 1/2021 | Neal ..................... B60N 2/4221 |
| 2021/0402903 A1 | 12/2021 | Di Censo et al. |

FOREIGN PATENT DOCUMENTS

| CN | 216331632 U | 4/2022 |
| EP | 3428005 B1 | 6/2021 |

* cited by examiner

*Primary Examiner* — Mark R Wendell
(74) *Attorney, Agent, or Firm* — Vichit Chea; Price Heneveld LLP

(57) ABSTRACT

A vehicle seating assembly includes a seat, a support surface, a seatback and a lower leg support. The seat includes a forward end and a rearward end. The support surface is coupled to the seat. The seatback is rotatably coupled to the seat proximate the rearward end. The lower leg support is directly and rotatably coupled to the seat proximate the forward end. The lower leg support is directly coupled to the support surface in a manner that results in automatic mechanical deployment of the lower leg support when the seat and the seatback are moved toward a reclined-and-raised position.

19 Claims, 7 Drawing Sheets

VEHICLE SEATING ASSEMBLY WITH LOWER LEG SUPPORT

FIELD OF THE DISCLOSURE

The present disclosure generally relates to a vehicle seating assembly. More specifically, the present disclosure relates to a vehicle seating assembly with a lower leg support.

BACKGROUND OF THE DISCLOSURE

Vehicles are often provided with one or more seating assemblies. Seating solutions provided within a passenger compartment of a vehicle can be a deciding factor in consumers purchase decisions.

SUMMARY OF THE DISCLOSURE

According to a first aspect of the present disclosure, a vehicle seating assembly includes a seat, a seatback, and a lower leg support. The seat includes a forward end and a rearward end. A support surface is coupled to the seat. The seatback is rotatably coupled to the seat proximate the rearward end. The lower leg support is directly and rotatably coupled to the seat proximate the forward end. The lower leg support is directly coupled to the support surface in a manner that results in automatic mechanical deployment of the lower leg support when the seat and the seatback are moved toward a reclined-and-raised position.

Embodiments of the first aspect of the disclosure can include any one or a combination of the following features:
- a front leg that extends from an underside of the seat toward the support surface an anchor assembly that is coupled to the front leg, wherein the anchor assembly is configured to releasably couple with the support surface such that the anchor assembly is movable between an engaged position and a disengaged position relative to the support surface;
- the reclined-and-raised position includes placing the anchor assembly in the disengaged position;
- the reclined-and-raised position further includes increasing a first distance between an underside of the forward end of the seat and the support surface;
- the reclined-and-raised position further includes increasing a second distance between the anchor assembly and the support surface;
- the reclined-and-raised position further includes rotating the seatback rearward from a seated position such that an angle between the seat and the seatback increases;
- the reclined-and-raised position further includes decreasing a third distance between a rear leg and the rearward end of the seat;
- an actuator assembly coupled to the seat and configured for coupling to the support surface;
- the lower leg support includes a first member and a second member, wherein the first member includes a first end and a second end, wherein the first end is configured to be rotatably coupled to the support surface, and wherein the second member includes a coupled portion and a free portion;
- the coupled portion of the second member includes a first end and a second end, wherein the first end of the coupled portion is rotatably coupled to the second end of the first member;
- the lower leg support further includes a third member that is coupled to the forward end of the seat and extends outwardly therefrom;
- the second end of the coupled portion of the second member is rotatably coupled to the third member;
- the free end of the second member is provided with a cushion assembly that is configured to engage with a lower leg region of a user;
- a distance between the free end and the first member increases when the lower leg support is moved toward the reclined-and-raised position; and
- the first member extends downwardly toward the support surface along a side of the seat.

According to a second aspect of the present disclosure, a vehicle seating assembly includes a seat, a seatback, a lower leg support, a front leg, and an anchor assembly. The seat includes a forward end and a rearward end. The seat is configured to be coupled to a support surface. The seatback is rotatably coupled to the seat proximate the rearward end. The lower leg support is directly and rotatably coupled to the seat proximate the forward end. The lower leg support is configured to be directly coupled to the support surface in a manner that results in automatic mechanical deployment of the lower leg support when the seat and the seatback are moved toward a reclined-and-raised position. The front leg extends downwardly from an underside of the seat. The anchor assembly is coupled to the front leg. The anchor assembly is configured to releasably couple with the support surface such that the anchor assembly is movable between an engaged position and a disengaged position relative to the support surface. The reclined-and-raised position includes placing the anchor assembly in the disengaged position. The reclined-and-raised position includes increasing a first distance between the underside of the forward end of the seat and the support surface. The reclined-and-raised position includes increasing a second distance between the anchor assembly and the support surface. The reclined-and-raised position includes rotating the seatback rearward from a seated position such that an angle between the seat and the seatback increases. The reclined-and-raised position includes decreasing a third distance between a rear leg and the rearward end of the seat.

Embodiments of the second aspect of the present disclosure can include any one or a combination of the following features:
- an actuator assembly coupled to the underside of the seat and configured for coupling to the support surface, wherein the actuator assembly is responsible for the increasing of the first distance between the underside of the forward end of the seat and the support surface and is responsible for the increasing of the second distance between the anchor assembly and the support surface;
- the lower leg support includes a first member and a second member, wherein the first member includes a first end and a second end, wherein the first end is configured to be rotatably coupled to the support surface, wherein the second member includes a coupled portion and a free portion, wherein the coupled portion of the second member comprises a first end and a second end, and wherein the first end of the coupled portion is rotatably coupled to the second end of the first member;
- the lower leg support further includes a third member that is coupled to the forward end of the seat and extends outwardly therefrom, wherein the second end of the coupled portion of the second member is rotatably coupled to the third member, wherein the free end of the second member is provided with a cushion assembly that is configured to engage with a lower leg region of a user, and wherein a distance between the free end and the first member increases when the lower leg support is moved toward the reclined-and-raised position; and the first member extends downwardly toward the support surface along a side of the seat.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
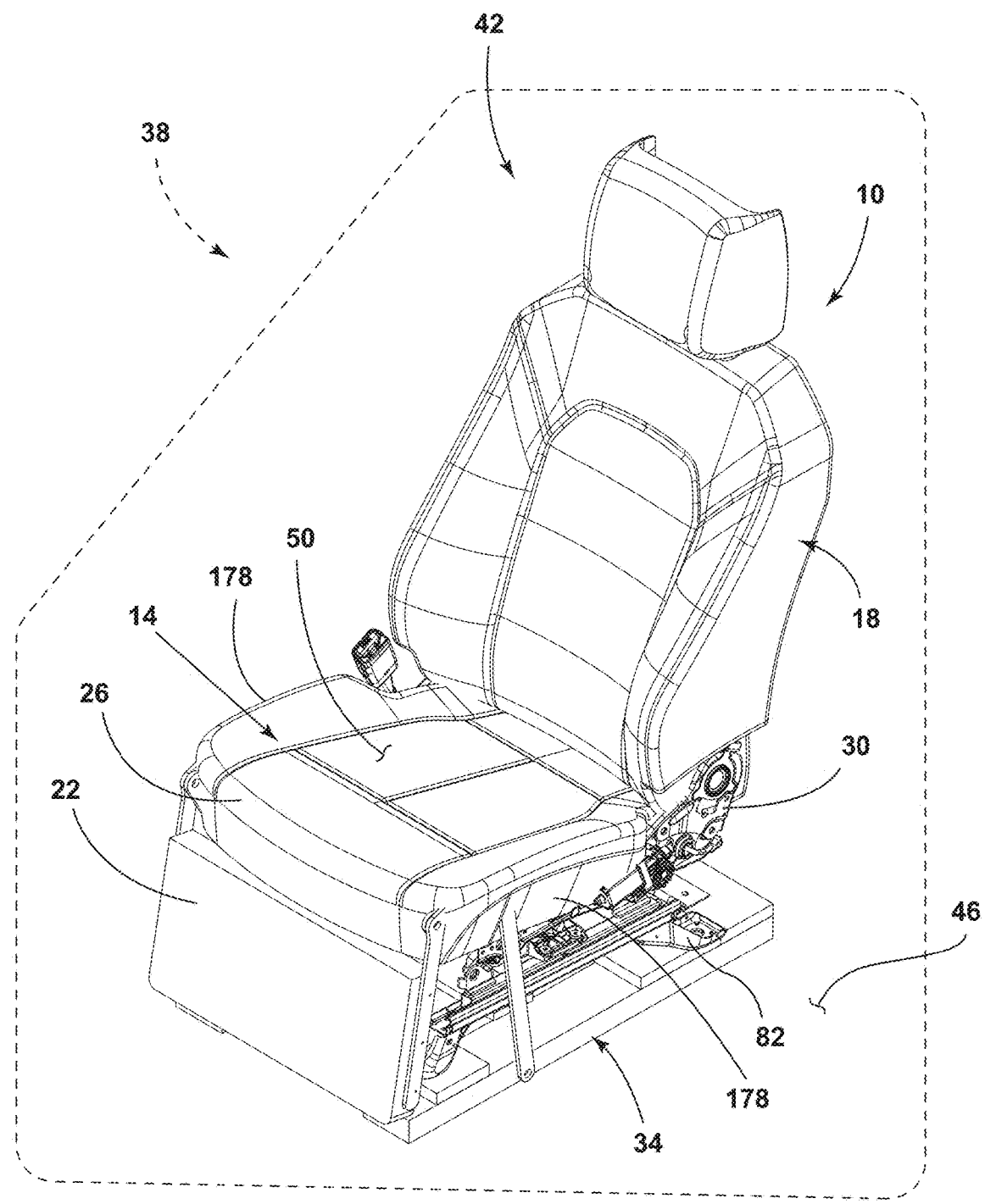
FIG. 1 is a front perspective view of a vehicle seating assembly, illustrating a seated position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, a vehicle seating assembly 10 includes a seat 14, a seatback 18, and a lower leg support 22. The seat 14 includes a forward end 26 and a rearward end 30. The seat 14 is coupled to a support surface 34. The seatback 18 is rotatably coupled to the seat 14 proximate the rearward end 30. The lower leg support 22 is directly and rotatably coupled to the seat 14 proximate the forward end 26. The lower leg support 22 is directly coupled to the support surface 34 in a manner that results in automatic mechanical deployment of the lower leg support 22 when the seat 14 and the seatback 18 are moved toward a reclined-and-raised position (see FIGS. 2, 4, 6, and 7).

Referring again to FIGS. 1-7, the vehicle seating assembly 10 may be positioned within a vehicle 38. For example, the vehicle seating assembly 10 may be positioned within a passenger compartment 42 of the vehicle 38. In such an example, the support surface 34 may be a floor 46 of the vehicle 38. The vehicle 38 may be a motor vehicle. For example, the vehicle 38 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 38 may be a motor vehicle, the present disclosure is not limited to internal combustion engines as a source of locomotive power for the vehicle 38. Rather, alternative sources may be utilized in providing locomotive power to the vehicle 38. For example, locomotive power may be provided to the vehicle 38 by electric motors, fuel cells, and/or petroleum-based fuel engines. According to various examples, the vehicle 38 may be driver-controlled, semi-autonomous, fully-autonomous, or any combination of user-controlled and automated. For example, the semi-autonomous example of the vehicle 38 may perform many, or all, commuting functions (e.g., accelerating, braking, turning, signaling, etc.) independent of user interaction while the user maintains override control of the vehicle 38.

Figure 2:
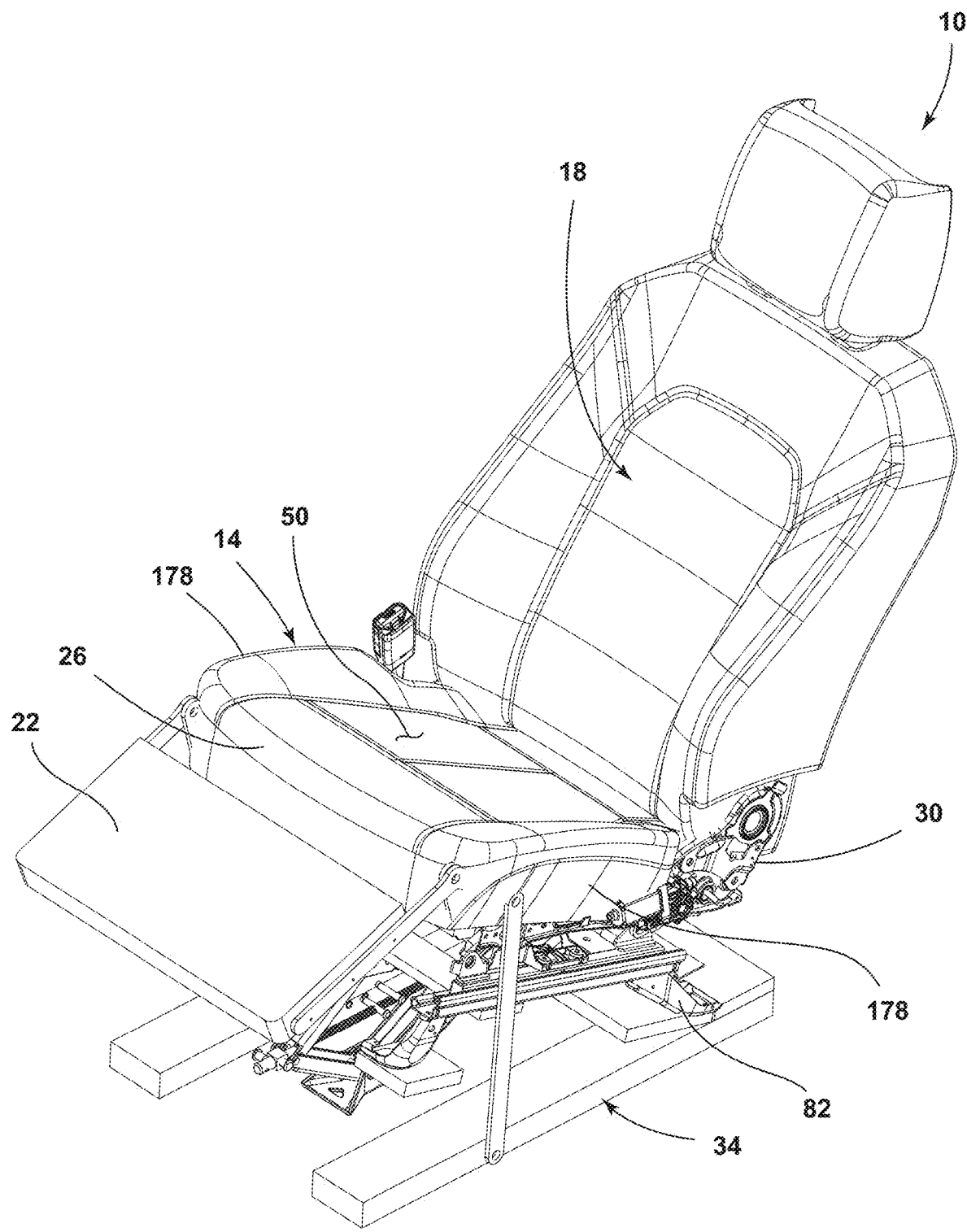
FIG. 2 is a front perspective view of the vehicle seating assembly, illustrating a reclined-and-raised position, according to one example.
Figure 3:
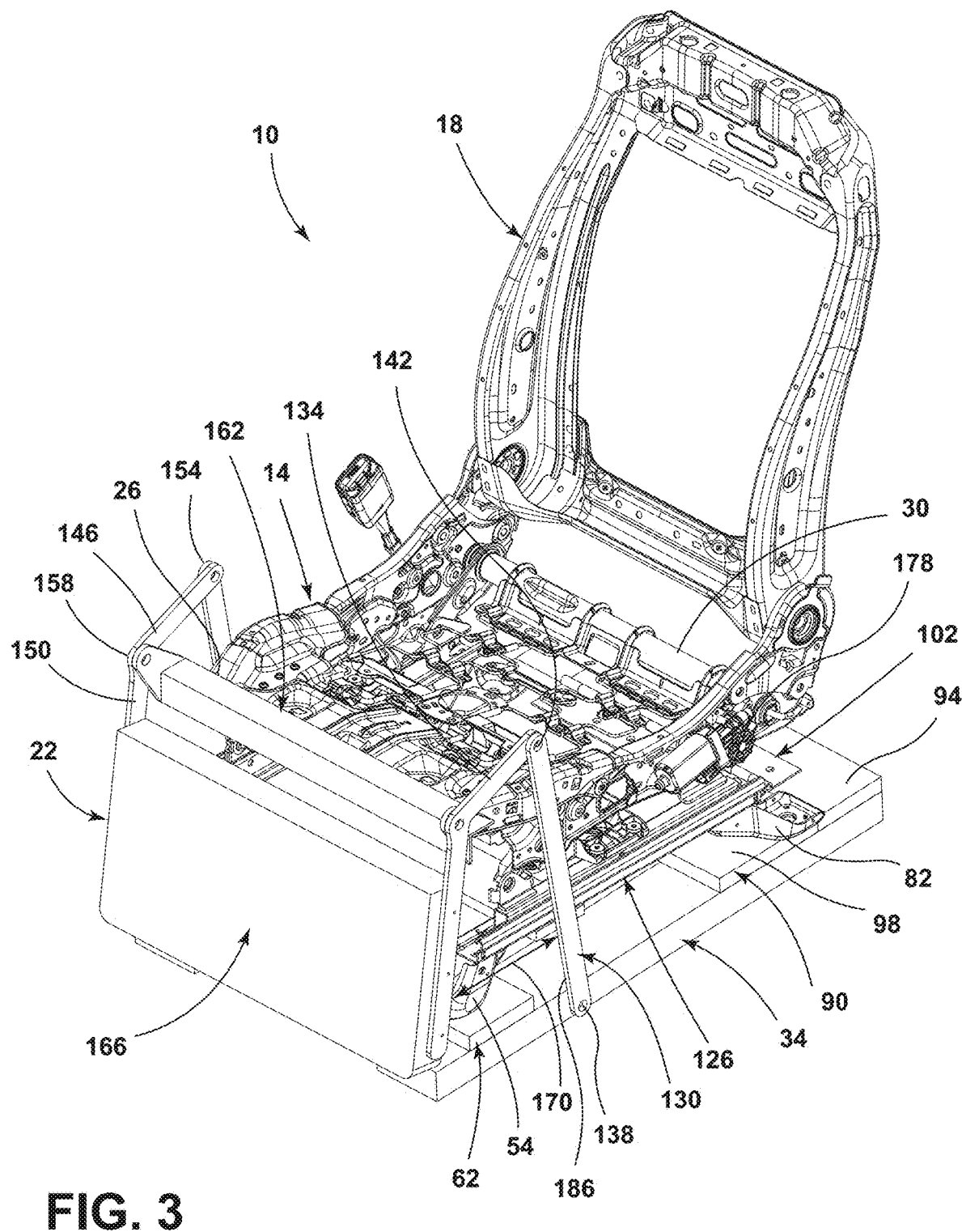
FIG. 3 is a front perspective view of the vehicle seating assembly, illustrating components of a lower leg support when the vehicle seating assembly is in the seated position, according to one example.
Figure 4:
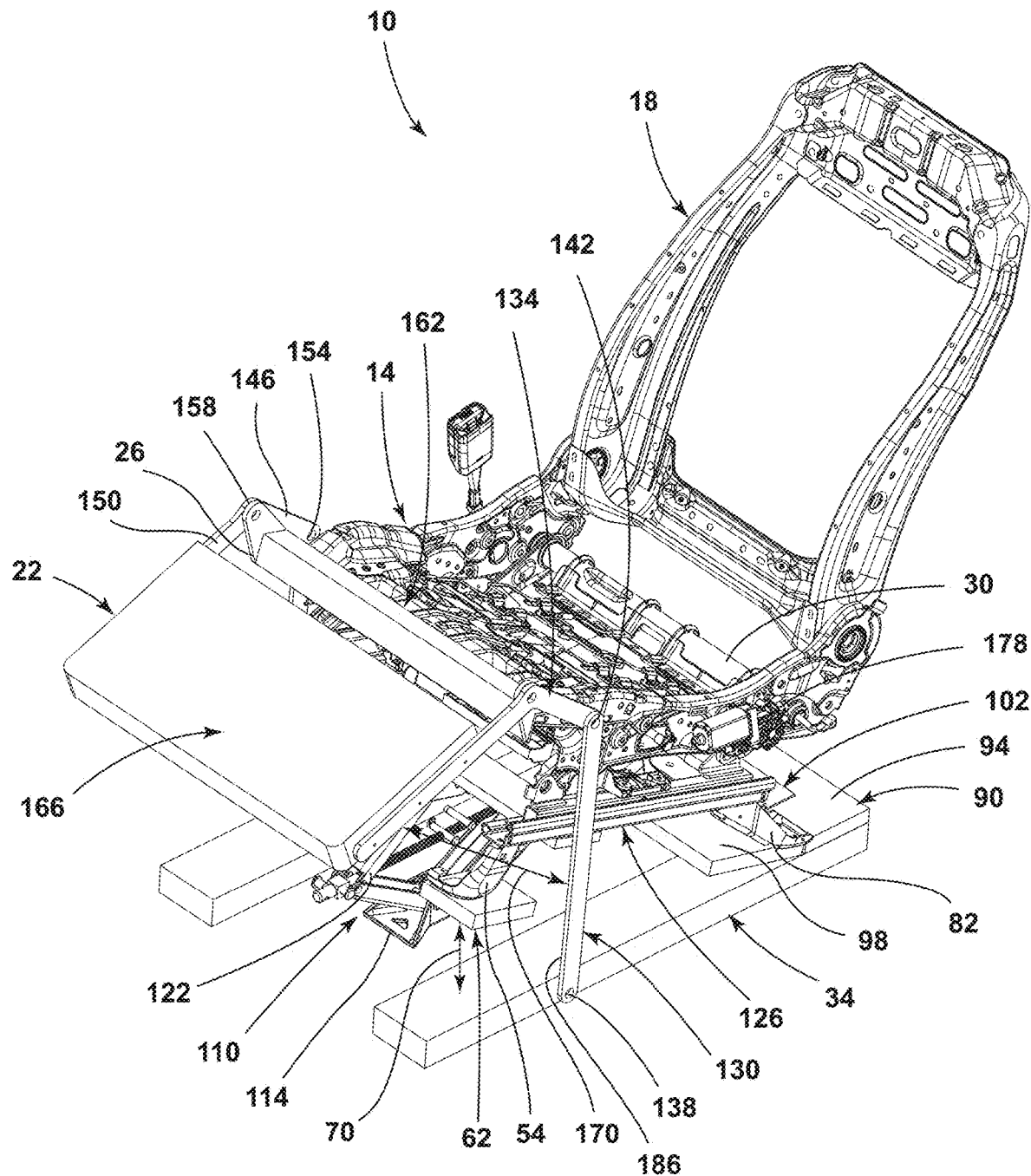
FIG. 4 is a front perspective view of the vehicle seating assembly, illustrating components of the lower leg support when the vehicle seating assembly is in the reclined-and-raised position, according to one example.
Figure 5:
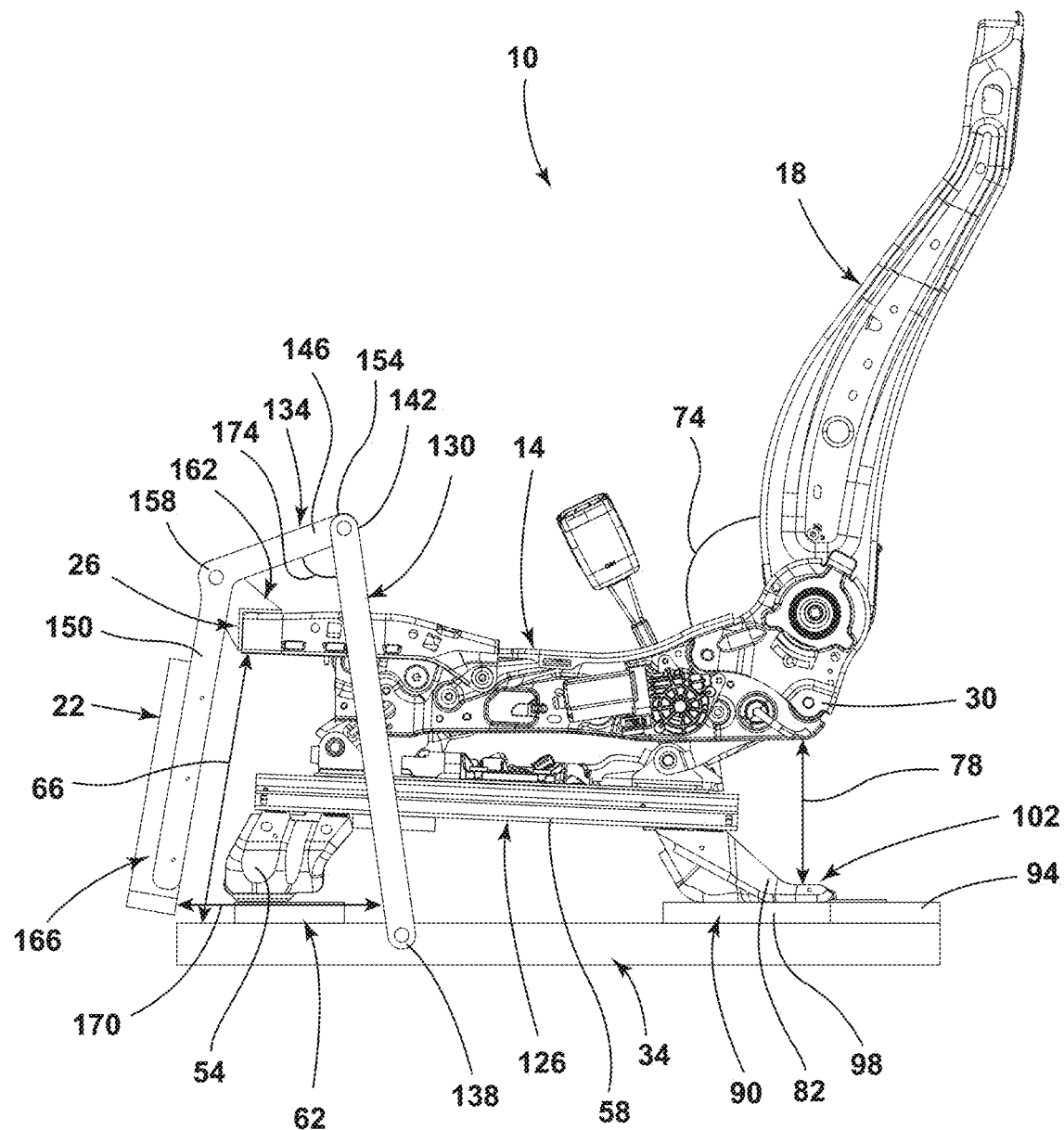
FIG. 5 is a side view of the vehicle seating assembly, illustrating components of the lower leg support when the vehicle seating assembly is in the seated position, according to one example.
Figure 6:
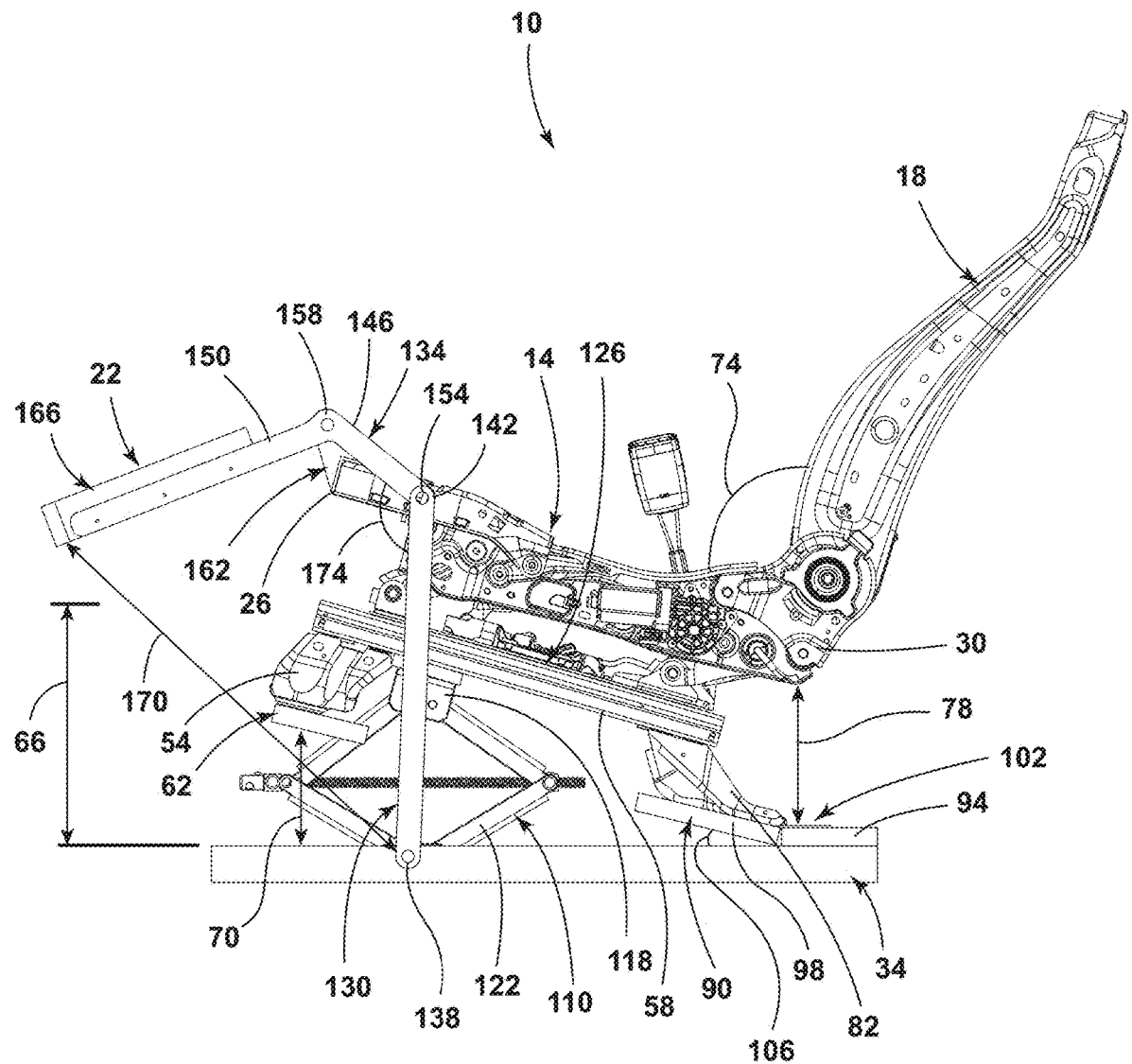
FIG. 6 is a side view of the vehicle seating assembly, illustrating components of the lower leg support and an actuator assembly when the vehicle seating assembly is in the reclined-and-raised position, according to one example.
Figure 7:
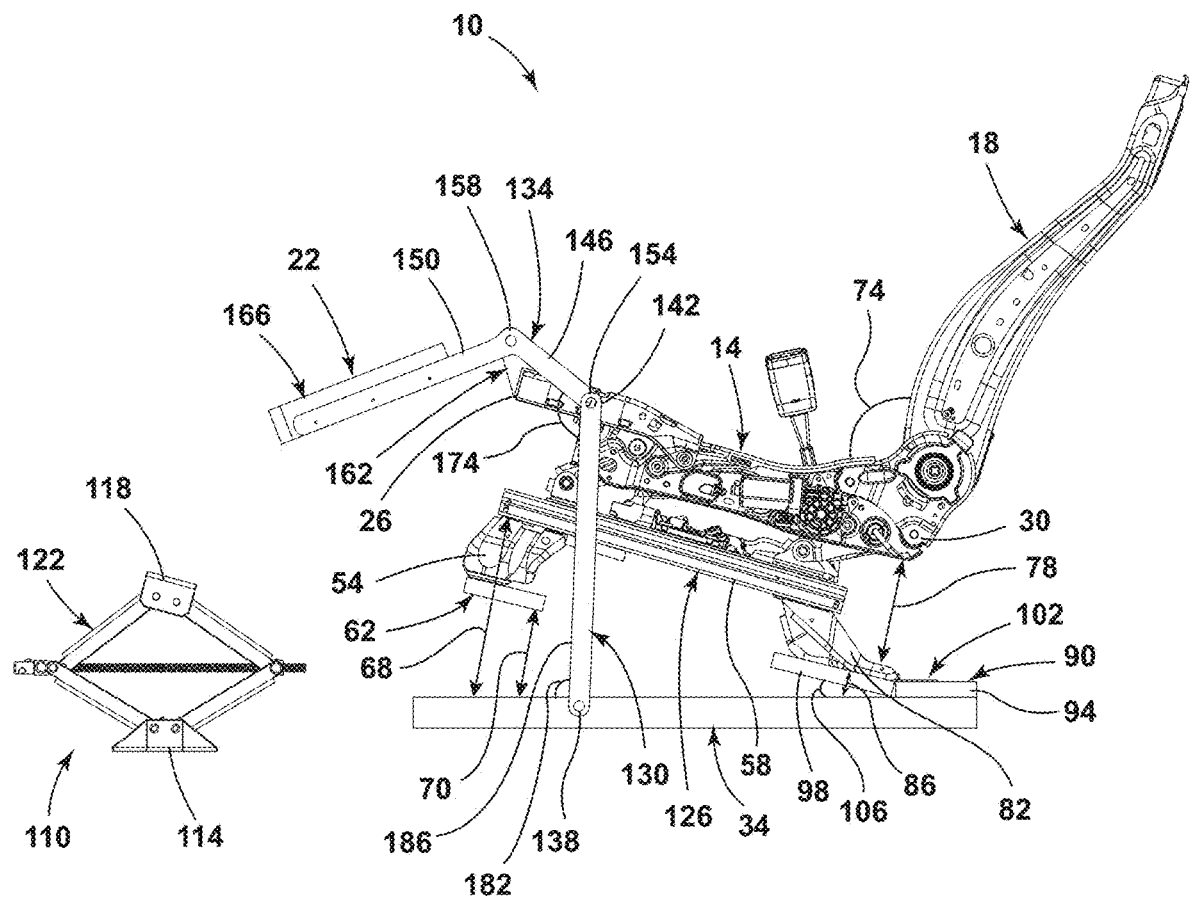
FIG. 7 is a side view of the vehicle seating assembly, illustrating components of the lower leg support and the actuator assembly when the vehicle seating assembly is in the reclined-and-raised position with the actuator assembly separated from the vehicle seating assembly for illustrative purposes, according to one example.

Referring now to FIGS. 1 and 2, the vehicle seating assembly 10 is capable of moving from a seated position (see FIG. 1) toward a reclined-and-raised position (see FIG. 2). The reclined-and-raised position of the vehicle seating assembly 10 is intended for use when the vehicle 38 is in a stationary (i.e., non-moving) state. For example, while a transmission of the vehicle 38 is in a parked position. However, while all modern OEMs of passenger vehicles currently warn occupants against reclining the vehicle seating assembly 10 past a certain angle while the vehicle 38 is moving and/or in riding in a fully reclined or supine position due to safety concerns, it is anticipated that technology and the regulatory framework may evolve in the future where such an activity is permissible. In the reclined-and-raised position, an angular relationship between the seat 14 and the support surface 34 can be adjusted. A distance between the forward end 26 of the seat 14 and the support surface 34 may increase when the vehicle seating assembly 10 is transitioned from the seated position to the reclined-and-raised position. In such an example, a distance between the rearward end 30 of the seat 14 and the support surface 34 may decrease when the vehicle seating assembly 10 is transitioned from the seated position to the reclined-and-raised position. In various examples, a seating surface 50 of the seat 14 is not the only structure whose angular relationship relative to the support surface 34 is adjusted when the seat 14 is moved to the reclined-and-raised position. Rather, in various examples, each component that is positioned between the seat 14 and the support surface 34 may be adjusted in its angular relationship relative to the support surface 34 when the vehicle seating assembly 10 is transitioned to the reclined-and-raised position.

As depicted in FIG. 2, a front of the vehicle seating assembly 10 may be decoupled from the support surface 34 such that the front of the vehicle seating assembly 10 is lifted off of the support surface 34 as the vehicle seating assembly 10 is transitioned from the seated position to the reclined-and-raised position. In such an example, a portion of the lower leg support 22 may remain coupled to the support surface 34 such that the lifting of the front of the vehicle seating assembly 10 induces actuation of the lower leg support 22 toward a position that is designed to engage a lower leg region of a user. Accordingly, the lower leg support 22 may act as a linkage assembly that automatically mechanically deploys when the front of the vehicle seating assembly 10 is adjusted toward the reclined-and-raised position. Said another way, the lower leg support 22 may be transitioned between a stowed position (FIG. 1) and a deployed position (FIG. 2) without the lower leg support 22 being provided with a dedicated motor that is responsible for such movement. In some examples, the user may induce the decoupling of the front of the vehicle seating assembly 10 from the support surface 34 (e.g., by actuating a button or actively disengaging a component of the vehicle seating assembly 10) and transition the vehicle seating assembly 10 from the seated position toward the reclined-and-raised position by applying rearward pressure to the seatback 18. As stated above, the reclined-and-raised position of the vehicle seating assembly 10 is intended for use when the vehicle 38 is in a stationary (i.e., non-moving) state. For example, while a transmission of the vehicle 38 is in a parked position. However, while all modern OEMs of passenger vehicles currently warn occupants against reclining the vehicle seating assembly 10 past a certain angle while the vehicle 38 is moving and/or in riding in a fully reclined or supine position due to safety concerns, it is anticipated that technology and the regulatory framework may evolve in the future where such an activity is permissible.

Referring now to FIGS. 3-7, the vehicle seating assembly 10 includes one or more front legs 54 that extend from an underside 58 of the seat 14 toward the support surface 34. An anchor assembly 62 is coupled to at least one of the one or more front legs 54. The anchor assembly 62 is configured to releasably couple with the support surface 34 such that the anchor assembly 62 is movable between an engaged position and a disengaged position relative to the support surface 34. When the vehicle seating assembly 10 is in the seated position (FIGS. 3 and 5), the anchor assembly 62 can be in the engaged position such that the anchor assembly 62 maintains contact with the support surface 34. When a user desires to transition the vehicle seating assembly 10 from the seated position toward the reclined-and-raised position, the anchor assembly 62 is placed in the disengaged position.

Referring again to FIGS. 3-7, when the anchor assembly 62 is in the disengaged position, the vehicle seating assembly 10 is capable of increasing the distance between the forward end 26 of the seat 14 and the support surface 34 (FIGS. 4, 6, and 7). Said another way, transitioning the vehicle seating assembly 10 from the seated position toward the reclined-and-raised position includes increasing a first distance 66 between the underside 58 of the forward end 26 of the seat 14 and the support surface 34. In various examples, transitioning the vehicle seating assembly 10 from the seated position toward the reclined-and-raised position also includes increasing a second distance 70 between the anchor assembly 62 and the support surface 34. When the vehicle seating assembly 10 is in the seated position, the anchor assembly 62 and the support surface 34 can be in direct physical contact such that the second distance 70 is very small or nonexistent. Said another way, the second distance 70 may be zero when the vehicle seating assembly 10 is in the seated position.

Referring further to FIGS. 3-7, transitioning the vehicle seating assembly 10 from the seated position toward the reclined-and-raised position can include rotating the seatback 18 rearward from the seated position such that an angle 74 between the seat 14 and the seatback 18 increases. In various examples, transitioning the vehicle seating assembly 10 from the seated position toward the reclined-and-raised position can include decreasing a third distance 78 between a rear leg 82 and the rearward end 30 of the seat 14. In some examples, a fourth distance 86 between the rear leg 82 and the support surface 34 may increase when the vehicle seating assembly 10 is transitioned from the seated position toward the reclined-and-raised position. In such an example, the rear leg 82 may be coupled to the support surface 34 by an intermediate structure 90.

Referring still further to FIGS. 3-7, the intermediate structure 90 can include a first member 94 and a second member 98. The first member 94 of the intermediate structure 90 may be fixedly coupled to the support surface 34. The second member 98 of the intermediate structure 90 may be movably coupled to the support surface 34. For example, the second member 98 of the intermediate structure 90 may be hingedly coupled or pivotably coupled to the first member 94 such that the second member 98 is movable relative to the support surface 34 and the first member 94. The first member 94 and the second member 98 may be coupled to one another by a hinge assembly 102. The first member 94 of the intermediate structure 90 may remain in direct physical abutting contact with the support surface 34 regardless of whether the vehicle seating assembly 10 is in the seated position, the reclined-and-raised position, or an intermediate position therebetween.

By contrast, the second member 98 of the intermediate structure 90 may have the same direct physical abutting contact with the support surface 34 as the first member 94 when the vehicle seating assembly 10 is in the seated position; however, as the vehicle seating assembly 10 is transitioned from the seated position toward the reclined-and-raised position, a surface area of contact between the second member 98 and the support surface 34 may progressively decrease. Said another way, a surface area of contact between the second member 98 and the support surface 34 may be greatest when the vehicle seating assembly 10 is in the seated position and the surface area of contact between the second member 98 and the support surface 34 may be least when the vehicle seating assembly 10 is in the reclined-and-raised position. Accordingly, when the vehicle seating assembly 10 is at an intermediate position between the seated position and the reclined-and-raised position, the surface area of contact between the second member 98 and the support surface 34 may have a value that is intermediate to the surface areas of contact in the seated position and the reclined-and-raised position. As the vehicle seating assembly 10 is transitioned from the seated position toward the reclined-and-raised position, the fourth distance 86 increases. As the fourth distance 86 increases, an angle 106 between the second member 98 and the support surface 34 can also increase.

As stated above, the reclined-and-raised position of the vehicle seating assembly 10 is intended for use when the vehicle 38 is in a stationary (i.e., non-moving) state. For example, while a transmission of the vehicle 38 is in a parked position. However, while all modern OEMs of passenger vehicles currently warn occupants against reclining the vehicle seating assembly 10 past a certain angle while the vehicle 38 is moving and/or in riding in a fully reclined or supine position due to safety concerns, it is anticipated that technology and the regulatory framework may evolve in the future where such an activity is permissible.

Referring yet again to FIGS. 3-7, the vehicle seating assembly 10 is provided with an actuator assembly 110 that is responsible, at least in part, for transitioning the vehicle seating assembly 10 between the seated position and the reclined-and-raised position. The actuator assembly 110 is coupled to the underside 58 of the seat 14 and is configured to be coupled to the support surface 34. In the depicted example, the actuator assembly 110 is shown as a scissor lift or scissor jack. However, the present disclosure is not limited to such a structure and the scissor lift or scissor jack is simply shown as an illustrated example of the actuator assembly 110. In general, the actuator assembly 110 may be provided with a base portion 114 that is configured for coupling to the support surface 34, an engagement portion 118 that is configured to couple to a portion of the vehicle seating assembly 10 (e.g., the underside 58 of the seat 14), and an adjustment portion 122 that is positioned between the base portion 114 and the engagement portion 118. The adjustment portion 122 of the actuator assembly 110 is configured to adjust a distance between the base portion 114 and the engagement portion 118.

In various examples, the engagement portion 118 may be adjusted in its angular relationship to the base portion 114 and/or the support surface 34 as the vehicle seating assembly 10 is transitioned between the seated position and the reclined-and-raised position. An angular orientation of the engagement portion 118 relative to some components of the vehicle seating assembly 10 may remain constant regardless of the position of the vehicle seating assembly 10 as it is transitioned between the seated position and the reclined-and-raised position. For example, the angular orientation of the engagement portion 118 relative to the front leg 54, the rear leg 82, and/or longitudinal rails 126 may remain constant regardless of the position of the vehicle seating assembly 10 as it is transitioned between the seated position and the reclined-and-raised position. The longitudinal rails 126 can adjust a longitudinal position (e.g., a fore-aft position) of the seat 14 relative to the support surface 34.

Referring still further to FIGS. 3-7, the lower leg support 22 includes a first member 130 and a second member 134. The first member 130 includes a first end 138 and a second end 142. The first end 138 of the first member 130 of the lower leg support 22 is configured to be rotatably coupled to the support surface 34. The second member 134 of the lower leg support includes a coupled portion 146 and a free portion 150. The coupled portion 146 of the second member 134 of the lower leg support 22 includes a first end 154 and a second end 158. The first end 154 of the coupled portion 146 is rotatably coupled to the second end 142 of the first member 130 of the lower leg support 22. In various examples, the lower leg support 22 can include a third member 162 that is coupled to the forward end 26 of the seat 14 and extends outwardly therefrom. The second end 158 of the coupled portion 146 of the second member 134 can be rotatably coupled to the third member 162. The free portion 150 of the second member 134 can be provided with a cushion assembly 166 that is configured to engage with a lower leg region of a user.

Referring again to FIGS. 3-7, the cushion assembly 166 may engage the lower leg region (e.g., a calf region) of the user who is occupying the vehicle seating assembly 10 when the vehicle seating assembly 10 is in the seated position, the reclined-and-raised position, and/or intermediate positions therebetween. A distance, such as a fifth distance 170, between the free portion 150 of the second member 134 of the lower leg support 22 and the first member 130 of the lower leg support 22 may increase when the lower leg support 22 is moved toward the reclined-and-raised position from the seated position. Similarly, an angle 174 between the first member 130 and the second member 134 may increase as the vehicle seating assembly 10 is transitioned from the seated position toward the reclined-and-raised position. In various examples, the first member 130 of the lower leg support 22 extends downwardly toward the support surface 34 along a side 178 of the seat 14 (see also FIGS. 1 and 2). In some examples, an angle 182 between a front edge 186 of the first member 130 and the support surface 34 may increase as the vehicle seating assembly 10 is transitioned from the seated position to the reclined-and-raised position. As stated above, the reclined-and-raised position of the vehicle seating assembly 10 is intended for use when the vehicle 38 is in a stationary (i.e., non-moving) state. For example, while a transmission of the vehicle 38 is in a parked position. However, while all modern OEMs of passenger vehicles currently warn occupants against reclining the vehicle seating assembly 10 past a certain angle while the vehicle 38 is moving and/or in riding in a fully reclined or supine position due to safety concerns, it is anticipated that technology and the regulatory framework may evolve in the future where such an activity is permissible.

Vehicle seating assemblies are typically designed to meet a number of specifications that are dictated by their use within a passenger compartment of a vehicle. These specifications include, but are not limited to, spatial considerations within the passenger compartment, packaging of user-desired feature(s), and balancing user experience for a plurality of users within the passenger compartment (e.g., leg room). The vehicle seating assembly 10 of the present disclosure is provided with a lower leg support 22 that is capable of being coupled to the vehicle seating assembly 10 in an add-on manner such that the lower leg support 22 can be coupled to an existing platform of the vehicle seating assembly 10 that has been designed to meet the variety of specifications in the industry. The reclined-and-raised position of the vehicle seating assembly 10 may decrease a number of pressure points and/or an intensity of pressure points for a user seated in the vehicle seating assembly 10 while providing a more ergonomically comfortable arrangement than a conventional reclined position where the seatback 18 may be moved relative to the seat 14 and the support surface 34 in an isolated manner. The reclined-and-raised position of the vehicle seating assembly 10 of the present disclosure may place the seatback 18 in a reclined position relative to the support surface 34 and/or the seat 14. Additionally, the reclined-and-raised position of the vehicle seating assembly 10 of the present disclosure can place the forward end 26 of the seat 14, the lower leg support 22, the front leg 54, the rear leg 82, the anchor assembly 62, and/or the second member 98 of the intermediate structure 90 in a raised position relative to the support surface 34 when compared to the seated position.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
a seat having a forward end and a rearward end, wherein the seat is configured to be coupled to a support surface;
a seatback rotatably coupled to the seat proximate the rearward end;
a lower leg support directly and rotatably coupled to the seat proximate the forward end, wherein the lower leg support is configured to be directly coupled to the support surface in a manner that results in automatic mechanical deployment of the lower leg support when the seat and the seatback are moved toward a reclined-and-raised position;

a front leg that extends from an underside of the seat toward the support surface; and an anchor assembly that is coupled to the front leg, wherein the anchor assembly is configured to releasably couple with the support surface such that the anchor assembly is movable between an engaged position and a disengaged position relative to the support surface.

2. The vehicle seating assembly of claim 1, wherein the reclined-and-raised position includes placing the anchor assembly in the disengaged position.

3. The vehicle seating assembly of claim 2, wherein the reclined-and-raised position further includes increasing a first distance between an underside of the forward end of the seat and the support surface.

4. The vehicle seating assembly of claim 3, wherein the reclined-and-raised position further includes increasing a second distance between the anchor assembly and the support surface.

5. The vehicle seating assembly of claim 3, wherein the reclined-and-raised position further includes rotating the seatback rearward from a seated position such that an angle between the seat and the seatback increases.

6. The vehicle seating assembly of claim 3, wherein the reclined-and-raised position further includes decreasing a third distance between a rear leg and the rearward end of the seat.

7. The vehicle seating assembly of claim 3, further comprising:

an actuator assembly coupled to the seat and configured for coupling to the support surface.

8. A vehicle seating assembly, comprising:

a seat having a forward end and a rearward end, wherein the seat is configured to be coupled to a support surface;

a seatback rotably coupled to the seat proximate the rearward end; and a lower leg support directly and rotably coupled to the seat proximate the forward end, wherein the lower leg support is configured to be directly coupled to the support surface in a manner that results in automatic mechanical deployment of the lower leg support when the seat and the seatback are moved toward a reclined-and-raised position, wherein the lower leg support comprises:

a first member having a first end and a second end, wherein the first end is configured to be rotatably coupled to the support surface; and a second member having a coupled portion and a free portion.

9. The vehicle seating assembly of claim 8, wherein the coupled portion of the second member comprises a first end and a second end, and wherein the first end of the coupled portion is rotatably coupled to the second end of the first member.

10. The vehicle seating assembly of claim 9, wherein the lower leg support further comprises:

a third member that is coupled to the forward end of the seat and extends outwardly therefrom.

11. The vehicle seating assembly of claim 10, wherein the second end of the coupled portion of the second member is rotatably coupled to the third member.

12. The vehicle seating assembly of claim 11, wherein the free end of the second member is provided with a cushion assembly that is configured to engage with a lower leg region of a user.

13. The vehicle seating assembly of claim 12, wherein a distance between the free end and the first member increases when the lower leg support is moved toward the reclined-and-raised position.

14. The vehicle seating assembly of claim 8, wherein the first member extends downwardly toward the support surface along a side of the seat.

15. A vehicle seating assembly, comprising:

a seat having a forward end and a rearward end, wherein the seat is configured to be coupled to a support surface;

a seatback rotatably coupled to the seat proximate the rearward end;

a lower leg support directly and rotatably coupled to the seat proximate the forward end, wherein the lower leg support is configured to be directly coupled to the support surface in a manner that results in automatic mechanical deployment of the lower leg support when the seat and the seatback are moved toward a reclined-and-raised position;

a front leg that extends downwardly from an underside of the seat;

an anchor assembly that is coupled to the front leg, wherein the anchor assembly is configured to releasably couple with the support surface such that the anchor assembly is movable between an engaged position and a disengaged position relative to the support surface, wherein the reclined-and-raised position includes placing the anchor assembly in the disengaged position, wherein the reclined-and-raised position includes increasing a first distance between the underside of the forward end of the seat and the support surface, wherein the reclined-and-raised position includes increasing a second distance between the anchor assembly and the support surface, wherein the reclined-and-raised position includes rotating the seatback rearward from a seated position such that an angle between the seat and the seatback increases, and wherein the reclined-and-raised position includes decreasing a third distance between a rear leg and the rearward end of the seat.

16. The vehicle seating assembly of claim 15, further comprising:

an actuator assembly coupled to the underside of the seat and configured for coupling to the support surface, wherein the actuator assembly is responsible for the increasing of the first distance between the underside of the forward end of the seat and the support surface and is responsible for the increasing of the second distance between the anchor assembly and the support surface.

17. The vehicle seating assembly of claim 16, wherein the lower leg support comprises:

a first member having a first end and a second end, wherein the first end is configured to be rotatably coupled to the support surface; and a second member having a coupled portion and a free portion, wherein the coupled portion of the second member comprises a first end and a second end, and wherein the first end of the coupled portion is rotatably coupled to the second end of the first member.

18. The vehicle seating assembly of claim 17, wherein the lower leg support further comprises:

a third member that is coupled to the forward end of the seat and extends outwardly therefrom, wherein the second end of the coupled portion of the second member is rotatably coupled to the third member, wherein the free end of the second member is provided with a cushion assembly that is configured to engage with a lower leg region of a user, and wherein a distance between the free end and the first member increases when the lower leg support is moved toward the reclined-and-raised position.

19. The vehicle seating assembly of claim 18, wherein the first member extends downwardly toward the support surface along a side of the seat.

\* \* \* \* \*